Feb. 5, 1935.   C. FIRTH   1,989,796
METHOD OF PREPARING METAL FOR WELDING
Filed Nov. 14, 1930
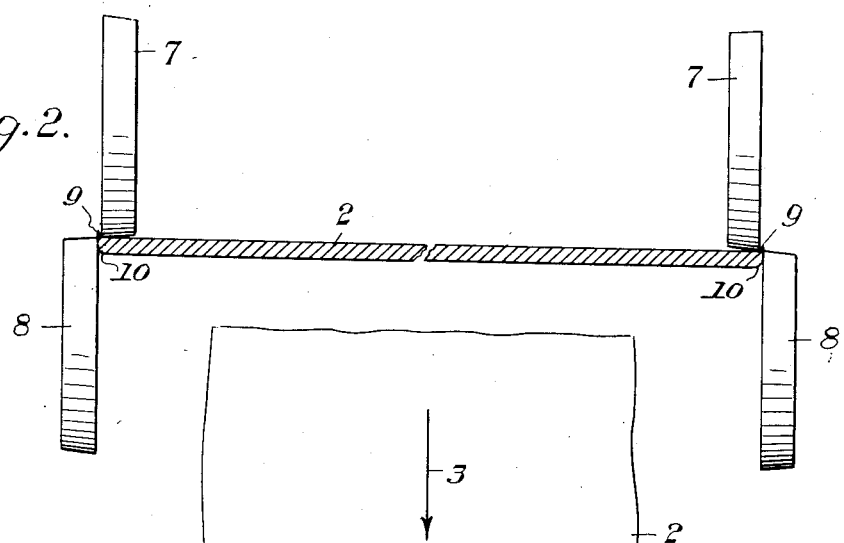
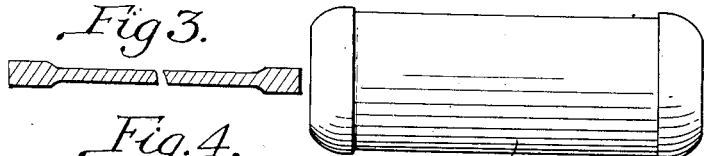
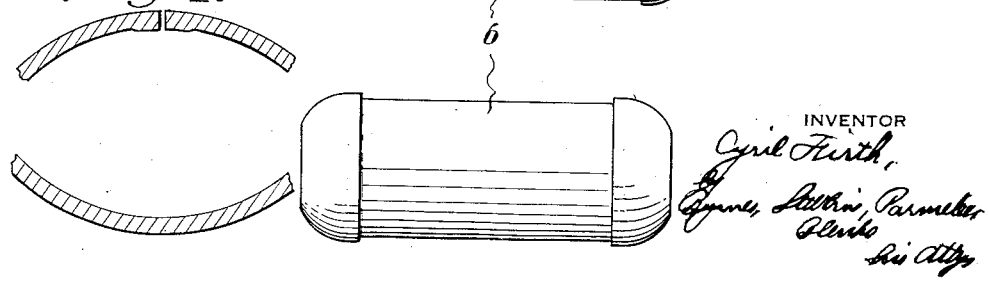
INVENTOR Patented Feb. 5, 1935

1,989,796

UNITED STATES PATENT OFFICE 1,989,796

METHOD OF PREPARING METAL FOR WELDING

Cyril Firth, Youngstown, Ohio, assignor to The Youngstown Sheet & Tube Company, Youngstown, Ohio, a corporation of Ohio Application November 14, 1930, Serial No. 495,652

2 Claims. (Cl. 29—156)

The present invention relates broadly to the art of metal working, and more particularly to an improved method by means of which sheets, plates or the like adapted for the formation of tubular articles are prepared for a welding operation.

While the utility of the present invention is not limited with respect to the particular characteristics of the metal bodies on which the preliminary operations are performed, such bodies will hereinafter be referred to as sheets, it being understood that such expression is used generically as a word of definition and not as a word of limitation.

In the commercial production of tubular articles by welding, it is customary to shear the sheets to the desired width and for the purpose of trimming the edges, then form the sheared sheets into substantially circular cross section, and thereafter subject the preformed sheets to a welding operation in a suitable type of welding apparatus. Irrespective of the characteristics of the apparatus, the degree of perfection obtained in the weld is governed at least to a large extent by the characteristics of the edge portions between which the seam is formed. If such edge portions are substantially straight and true, and are so held during the welding operation as to preclude overlapping thereof, desirable results may be obtained.

It has been found, however, that the production of an efficient weld is usually obtainable only by a suitable preliminary heating operation followed by a subsequent pressure application capable of exerting sufficient pressure to bring the heated portions into the desired welding relationship. Such pressure is sometimes sufficient to produce a partial riding of one sheet over the other or partial overlapping in such manner that the finished product is necessarily a compromise of the contemplated result.

In order to obviate this objection, it has heretofore been proposed to subject the sheets to a preliminary shaping or edge thickening operation by means of which the edge portions are thickened to such an extent that the area of contact therebetween in a direction radially of the tubular article is increased beyond that afforded by the thickness of the parent stock, whereby the tendency to overlap is proportionately reduced. The present invention has for one of its objects to provide for accomplishing such a thickening operation and for simultaneously sizing the sheets so as to provide blanks of accurate width, any excess or deficiency of metal in the sheared sheets being compensated for in the extent of thickening of the edge portions.

It is also customary in the commercial production of articles of the character hereinbefore referred to, to subject the sheets to an edge shearing or edge trimming operation in advance of the forming operation whereby to improve the accuracy of the sheets and the straightness of the edge portions. In the ordinary edge shearing operation, the shearing is accomplished by means of rotary shear blades, a pair of which is provided adjacent each edge with the shearing edges offset the required extent to permit the performance of the shearing step. As customarily mounted, the bottom shear blades are inside of the upper shear blades so that the finished sheet presents a bead or burr projecting downwardly from the sheared edge a greater or lesser amount depending upon the characteristics and efficiency of the shears themselves. Thereafter the sheared sheet is subjected to a forming operation which brings the bottom surface of the sheet on the outside of the cylindrical blank, so that the burrs formed by the shearing operation project upwardly from the parent body along opposite sides of the proposed line of weld.

I have found that such a condition is objectionable, and interferes with the proper welding operation. In accordance with the present invention, I re-locate the edge trimming shears in such manner that the upper shears lie within the shearing plane of the bottom shears whereby the burr formed by the trimming operation projects upwardly from the parent body in such manner that a subsequent forming operation will cause such burrs to project inwardly toward the center of the tubular body rather than outwardly as heretofore. In this manner, even without an edge thickening operation, the results obtained are materially improved. I have found, furthermore, that during an edge thickening operation on a previously trimmed sheet, the thickening effect is more pronounced on the side with the burr than on the opposite side whereby the major portion of the thickened metal is disposed inwardly of the formed blank in such position as to permit the production of an efficient weld.

The present invention therefore also contemplates the steps of shearing to produce a burr and shaping to cause the burr sides of the sheet to lie inwardly of the formed blank, and preferably also the step of performing an edge thickening operation on a previously trimmed sheet such that the major portion of the upset metal lies on the side of the burr and then subsequently shaping the sheet to bring the major portion of the thickened edges inwardly of the formed blank.

In the accompanying drawing I have shown for purposes of illustration only, certain preferred embodiments of the present invention. In the drawing:

Figure 1 is a diagrammatic top plan view illustrating the steps of shearing, edge thickening and preliminary forming;

Figure 2 is a transverse sectional view on the line II—II of Figure 1, looking in the direction of the arrows;

Figure 3 is a transverse sectional view along the line III—III of Figure 1, showing the upsetting somewhat exaggerated for the sake of clearness;

Figure 4 is a transverse sectional view showing a blank formed by bending the edges of the plate of Figure 3 upwardly and inwardly.

Referring first to Figures 1 and 2 of the drawing, I have indicated a sheet 2 travelling in the direction of the arrow 3 through edge trimming shears 4, edge thickening means 5 and blank forming means 6, all of which are indicated diagrammatically in part only. From Figure 2 it will be apparent that each of the edge trimming shears comprises an upper rotor or blade 7 and a lower rotor or blade 8, the upper blades being so mounted as to lie within the shearing plane of the lower blades. Due to this positioning of the parts, the shearing operation forms adjacent each edge of the sheet an upwardly projecting burr 9, the opposite surface of the sheet being characterized by a slight curvature or fillet 10.

After having been subjected to an edge trimming operation, the continued travel of the sheet brings it to edge thickening means 5, herein illustrated as comprising rolls or the like mounted on vertical shafts 11 and effective not only for sizing the sheet by compressing the same laterally, but for disposing the excess material into a thickened edge portion 12, the major portion of which lies on the upper side of the sheet, or the side on which the burr was formed by the edge trimming operation.

After the edges have been thickened in the manner described, as shown in Figure 3, the continued travel of the sheet brings it into engagement with suitable forming means herein illustrated as comprising a series of roll passes, only two of which are illustrated, effective for gradually bending the edge portions upwardly until a substantially circular blank is produced as shown in Fig. 4. Such a blank having been produced by an upward and inward bending of the edges of the sheet, it will be apparent that the predominating portion of upset metal adjacent the thickened edges lies within the body of the blank for reasons hereinbefore pointed out. The advantages of my invention will be obvious from what has already been said. In the first place, the burr resulting from the edge trimming is disposed inwardly of the finished product where it is out of the way and does not adversely affect the welding operation. The thickening of the edges of the plate internally, furthermore, further improves the character of the weld finally obtained. The invention is effective not only for disposing the desired quantity of metal adjacent the edges of the plate to be welded, whereby the characteristics of the finished weld are improved, but also for accurately sizing the plates as to width, and straightening the edges as to configuration, so that the necessary steps of the welding operation may be subsequently performed thereon very readily.

It will be apparent to those skilled in the art that while I have herein illustrated forming means as comprising a series of roll passes, any other desired type of forming means, such as the so-called "caterpillar" or endless belt type of formers including a series of travelling dies may be utilized, the particular construction of the forming means constituting no essential part of the present invention. Such a construction is shown in the co-pending application of James L. Adams, Jr., Serial No. 365,323, filed May 23, 1929.

While I have herein illustrated and described a certain preferred practice of the invention, it will be understood that changes therein may be made without departing either from the spirit of the invention or the scope of my broader claims.

I claim:

1. In the method of preparing sheets for welding, the steps comprising subjecting a sheet to an edge trimming operation to produce a burr along the trimmed edge, thereafter upsetting the edge portions of the sheet in such manner as to produce a greater increase in thickness on the side having said burr thereon than on the opposite side, and bending the sheets into tubes with the side having the burr on the inside.

2. In the method of preparing sheets for welding, the steps comprising subjecting the sheet to an edge trimming operation to produce a burr along the trimmed edge, immediately thereafter upsetting the edge portions of the sheet in such manner as to produce a greater increase in thickness on the side having said burr thereon than on the opposite side, and then shaping the sheet into a substantially tubular blank with the portions of greater thickness lying inwardly of the blank.

CYRIL FIRTH.